July 5, 1932. W. M. CARDEN 1,866,451
COLLAPSIBLE PONTOON FOR FLYING MACHINES
Filed April 6, 1931 3 Sheets-Sheet 1
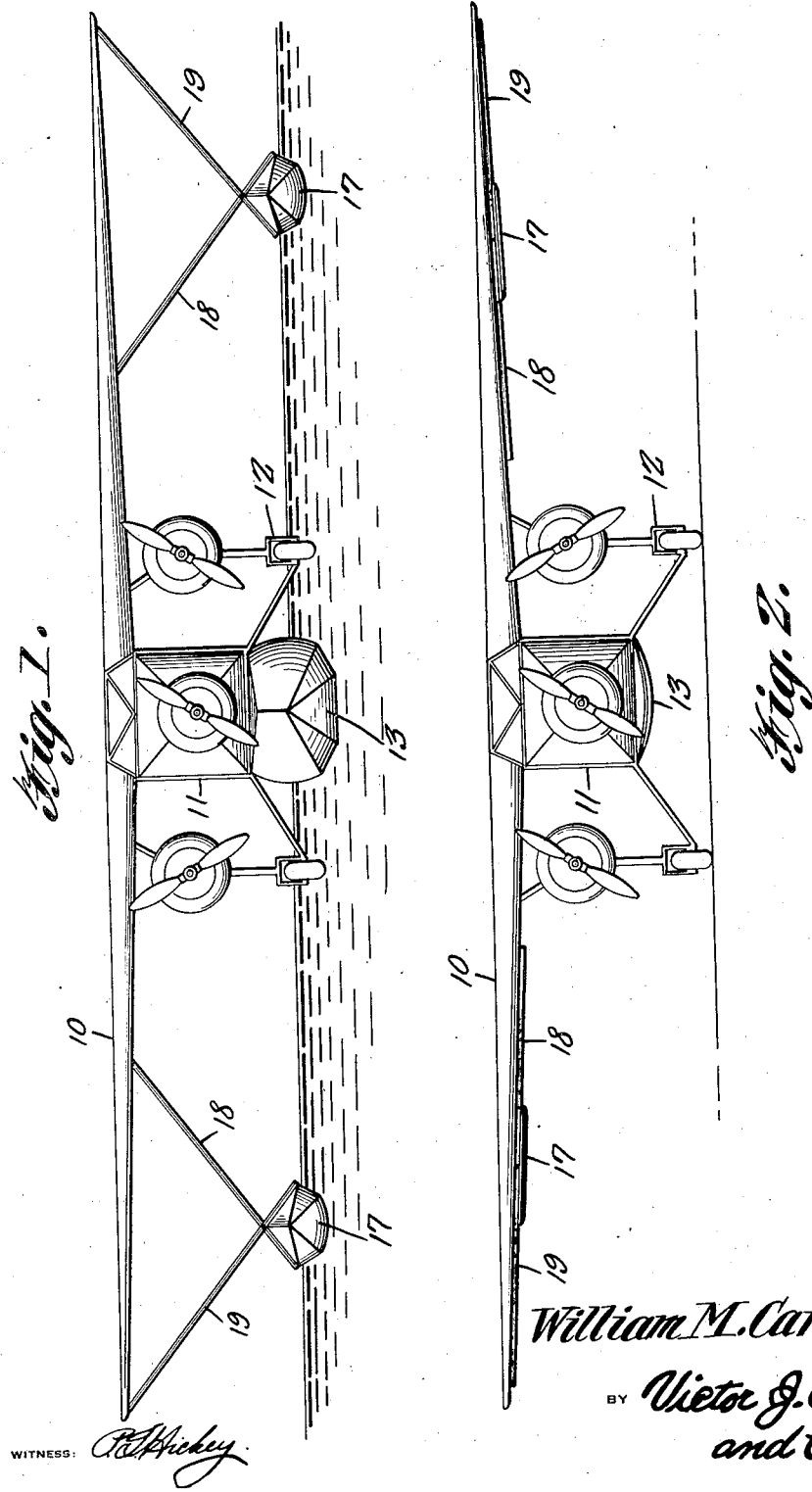

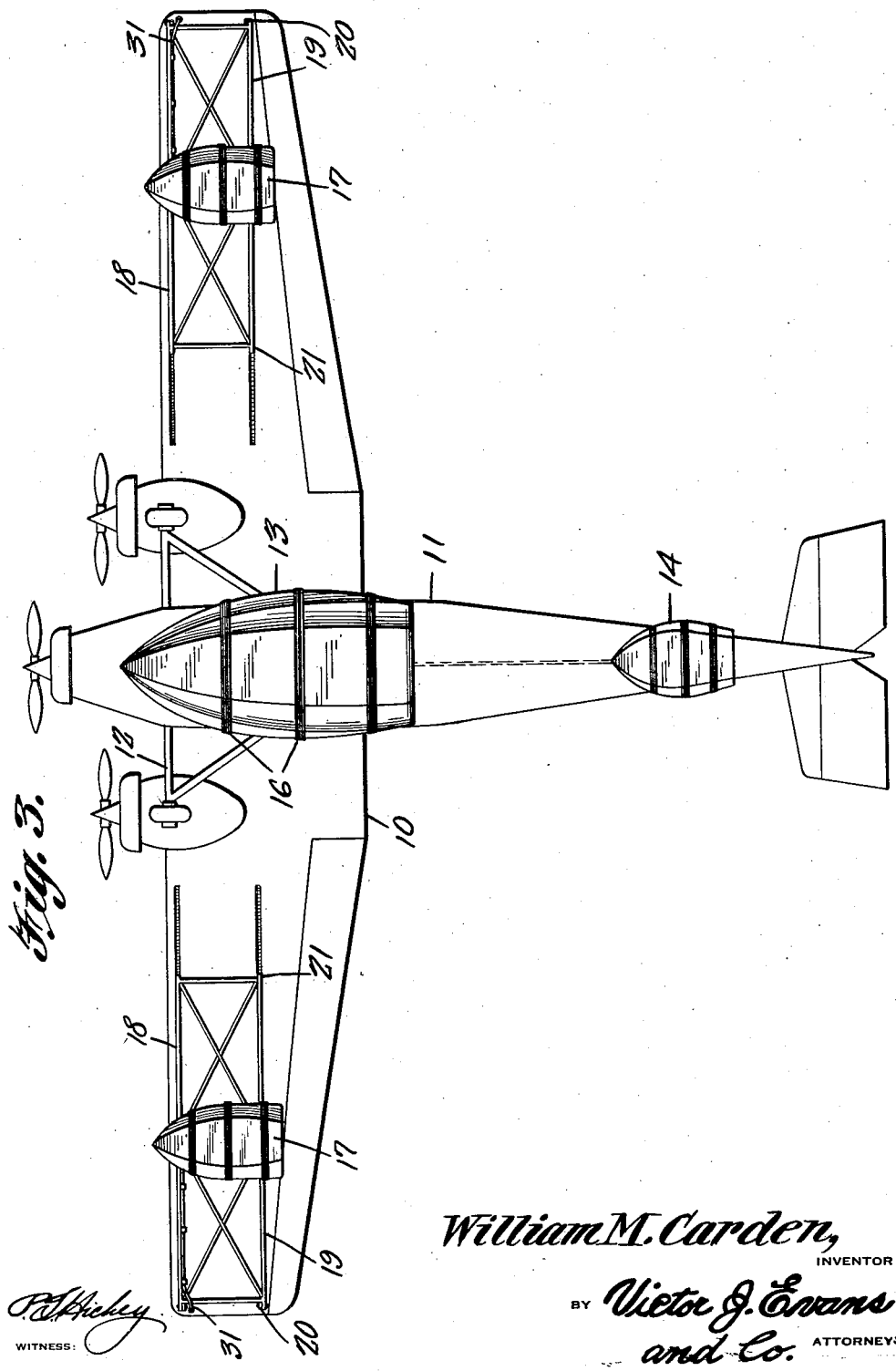

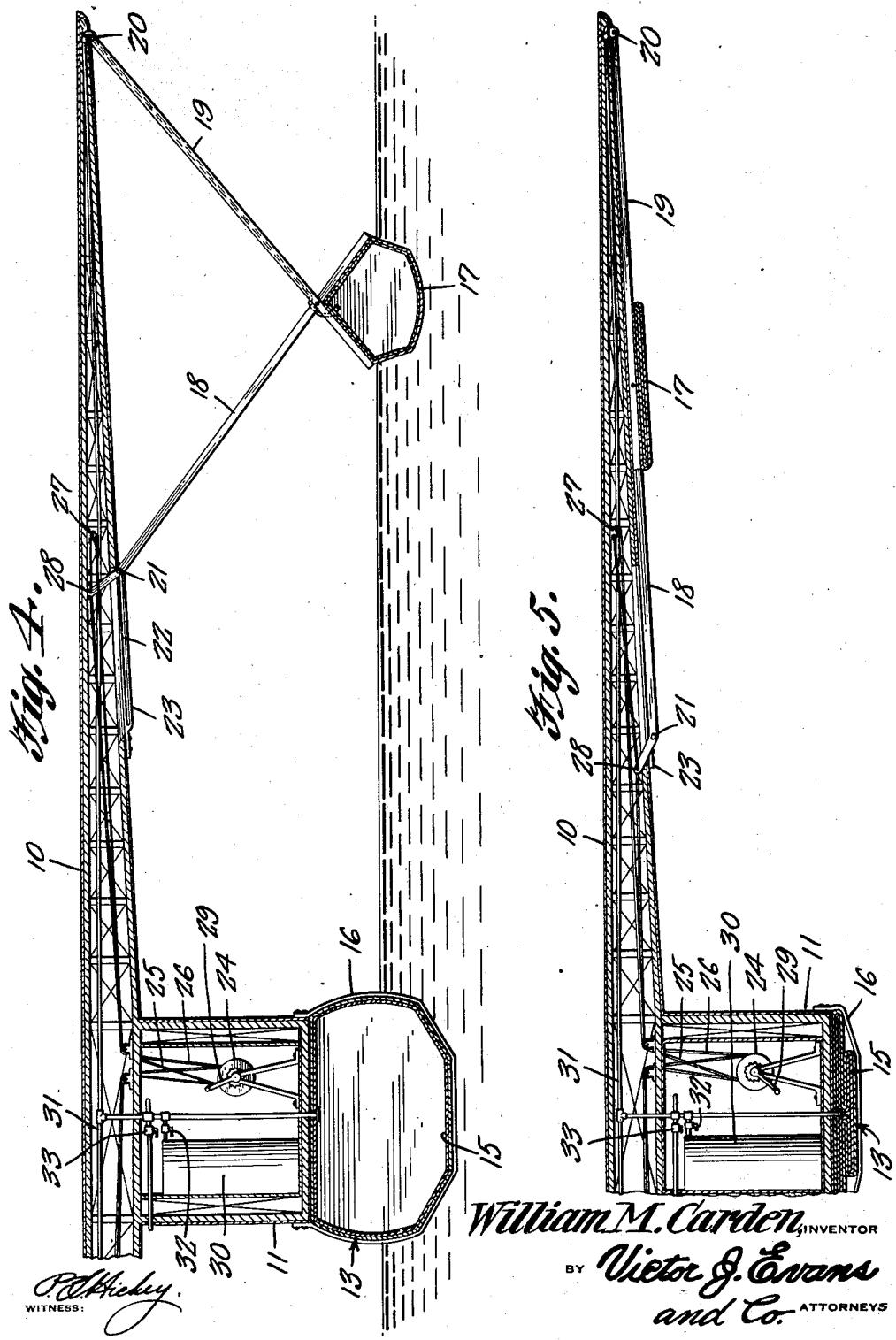

Patented July 5, 1932

1,866,451

UNITED STATES PATENT OFFICE

WILLIAM M. CARDEN, OF BIRMINGHAM, ALABAMA

COLLAPSIBLE PONTOON FOR FLYING MACHINES

Application filed April 6, 1931. Serial No. 528,153.

The invention relates to collapsible pontoons for flying machines, and more especially to interchangeable landing gears for aircrafts.

The primary object of the invention is the provision of pontoons or gears of the character specified, wherein should the aircraft be required to effect a landing, the pilot can elect accordingly to the nature of the landing to set pontoons for a water landing or the land gear will be usable for a ground landing, the pontoon mechanism being of novel construction and being arranged in a unique manner so that when collapsed, will be positioned to reduce air resistance to a minimum.

Another object of the invention is the provision of landing gear of this character, wherein the collapsible pontoons can be readily and conveniently extended at the will of the pilot or operator of the aircraft to permit a water landing of such craft, while the ground landing gear is a permanent part of the aircraft to assure ground landing at the election of the pilot or operator of the machine.

A further object of the invention is the provision of pontoons or landing gears of this character wherein undue shocks and jars are absorbed incident to the landing of the aircraft and such gears for a water landing are under a convenient control from the cockpit or pilot's station of the aircraft.

A further object of the invention is the provision of pontoons or landing gears of this character, wherein a water or ground landing of the aircraft can be effected without inconvenience to the pilot or operator of the machine, the landing gears being readily interchangeable at the will of the operator or pilot.

A still further object of the invention is the provision of pontoons or landing gears which will be strong, rigid and easily manipulated.

With the foregoing and other objects in view, the invention consists in the features of construction, combination and arrangement of parts, as will be hereinafter more fully described in detail, illustrated in the accompanying drawings which disclose the preferred embodiment of the invention, and pointed out in the claims hereunto appended.

In the accompanying drawings:—

Figure 1 is a front elevation of an aircraft, showing the interchangeable landing gears constructed in accordance with the invention, the water landing pontoons being extended for a water landing of the craft.

Figure 2 is a view similar to Figure 1, showing the water pontoons collapsed or retracted to permit a ground landing of the craft.

Figure 3 is a bottom plan view of the aircraft.

Figure 4 is a fragmentary enlarged vertical sectional view taken through the plane structure and cockpit of the aircraft, showing the water pontoons extended for use and illustrating in detail the manner of control thereof.

Figure 5 is a view similar to Figure 4, showing the pontoons collapsed or retracted when not in use.

Similar reference characters indicate corresponding parts throughout the several views in the drawings.

Referring to the drawings in detail, the aircraft comprises a plane or wing structure 10, in this instance the monoplane or wing type, although the plane or wing structure may be of any other type and of standard makeup. Depending medially from the plane or wing structure 10 is a suitable fuselage having a cockpit 11 and on this fuselage is carried a ground landing gear 12 of any approved type.

Arranged fore and aft on the fuselage at the bottom thereof are collapsible pontoons 13 and 14 respectively, each including a rubber bag 15 embraced by elastic webbing 16, the latter being fastened about said bag 15 to the fuselage. It is, of course, understood that the pontoons 13 and 14 are of a shape to afford the least resistance to the flight or travel of the aircraft and the elastic webbings serve to anchor the pontoons to the fuselage.

Located at the required distances from the outer ends of the plane or wing structure 10 and on opposite sides with relation to the pontoon 13 are outer collapsible pontoons 17, each constructed identically with said pontoons 13 and 14. The outer pontoons 17 are mounted on the free ends of pivotally connected crossed or toggle levers 18 and 19 respectively, it being understood, of course, that there is one pair of levers at each end of the plane or wing structure. The lever 19 of each pair is pivoted at 20 to a hanger or bearing at the outer end of the plane or wing structure 10 to swing toward and away from the latter, while the lever 18 carries a slide pivot 21 spaced from its inner end and adapted to travel in a runway 22 of a guide plate 23 mounted on the under side of the plane or wing structure, located spaced the required distance from the outer end of said plane or wing structure.

Within the cockpit 11 of the fuselage and suitably supported is a windlass 24 having connected thereto and adapted to be reversely wound thereon the stretches 25 and 26 of an endless cable, which is trained over a suitable pulley 27 mounted in the plane or wing structure outwardly with relation to the inner end of each lever 18, which latter at its inner end 28 is connected to one of the stretches of said cable, preferably the stretch 25 thereof. It will be observed on actuating the windlass 24, motion will be imparted to the cable to swing and shift each lever 18 so as to extend or retract the outer pontoons 17 with relation to the plane or wing structure. The axle of the windlass 24 carries a hand crank 29 for manipulation of said windlass.

Arranged at a suitable point within the cockpit 11 of the fuselage is a compressed air tank 30 from which extends a system of piping 31 having suitable leads communicating with the respective pontoons 13, 14 and 17 respectively, the system of piping being equipped with a cut-off valve 32 and a bleed valve 33 respectively so that the admission and exhaust of air under pressure to the pontoons and from the same can be had, these valves being located within the cockpit 11 for convenient control by the pilot or operator of the aircraft. It will be apparent that when compressed air from the tank 30 is admitted to the pontoons 13 14 and 17, the same will be extended and on the exhaust of the compressed air therefrom, such pontoons will become collapsed.

Normally in the use of the aircraft, the pontoons 13, 14 and 17 are collapsed and the said pontoons 17 retracted by the levers 18 and 19 against the under side of the plane or wing structure so as to offer the least air resistance in the flight of the aircraft. In this position of the pontoons, the landing gears will be properly exposed or protruded for ground landing. In the course of the flight of the aircraft, should it become evident that a water landing is to be had by reason of emergency, then the pilot or operator of the aircraft manipulates the windlass 24 so as to project the toggle levers 18 and 19, which extend the outer pontoon in working relation to the pontoons 13 and 14 and the compressed air tank, through the system of piping 31, is opened to the pontoon for expanding or extending the same, as is clearly illustrated in Figures 2 and 4 of the drawings. Thus the aircraft can, with safety, make a water landing.

It is, of course, understood that suitable mechanism or devices may be employed for the latching of the toggle levers extended or retracted and in this instance, the windlass is equipped with a ratchet mechanism 34 of any approved construction serving to hold the windlass against rotation and in this manner sustaining such toggle levers extended or retracted.

What is claimed is:—

1. The combination with an aircraft having a fuselage and plane structure, of a plurality of collapsible pontoons, elastic webbing connecting certain of the pontoons with the fuselage, means connecting the remaining pontoons with the plane structure for moving said pontoons in a plane with the pontoons related to the fuselage and ground landing gears carried by the fuselage.

2. The combination with an aircraft having a fuselage and plane structure, of a plurality of collapsible pontoons, certain of said pontoons related to the fuselage and the remaining pontoons related to the plane structure, mechanism within the fuselage for extending the pontoons in unison with each other, means for supporting the pontoons related with the plane structure for moving the same against the later and also in a plane with the pontoons on the fuselage, and elastic bands embracing said pontoons for effecting the collapsing thereof.

3. The combination with an aircraft having a fuselage and plane structure, of a plurality of collapsible pontoons, certain of the pontoons being fixed to the fuselage, pairs of crossed pivotally connected levers having the remaining pontoons carried at their free ends, one lever of each pair being pivotally connected with the plane structure and the other lever of each pair slidably connected with the latter, mechanism within the fuselage and connected with the slidable levers for opening and closing the pairs of pivoted levers, whereby on the opening of the latter the said remaining pontoons will be brought against the plane structure and on the closing of said levers these pontoons will be disposed in a plane with the pontoons on the fuselage, and means within the fuselage for extending the pontoons in unison with each other.

4. The combination with an aircraft having a fuselage and plane structure, of a plurality of collapsible pontoons, certain of the pontoons being fixed to the fuselage, pairs of crossed pivotally connected levers having the remaining pontoons carried at their free ends, one lever of each pair being pivotally connected with the plane structure and the other lever of each pair slidably connected with the latter, mechanism within the fuselage and connected with the slidable levers for opening and closing the pairs of pivoted levers, whereby on the opening of the latter the said remaining pontoons will be brought against the plane structure and on the closing of said levers these pontoons will be disposed in a plane with the pontoons on the fuselage, means within the fuselage for extending the pontoons in unison with each other, and elastic bands embracing said pontoons to effect the collapsing thereof.

In testimony whereof I affix my signature.

WILLIAM M. CARDEN.